United States Patent
Duncan et al.

(10) Patent No.: US 11,814,953 B2
(45) Date of Patent: *Nov. 14, 2023

(54) APPARATUS, SYSTEM, AND METHOD FOR INDICATING A POSITION OF VALVE OF WELLSITE EQUIPMENT

(71) Applicant: Intelligent Wellhead Systems Inc., Calgary (CA)

(72) Inventors: Robert Duncan, Calgary (CA); Murad Mohammad, Airdrie (CA); Lindsey William Harper, Calgary (CA)

(73) Assignee: Intelligent Wellhead Systems Inc., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/648,086

(22) Filed: Jan. 14, 2022

(65) Prior Publication Data

US 2022/0412209 A1 Dec. 29, 2022

Related U.S. Application Data

(63) Continuation of application No. 17/519,247, filed on Nov. 4, 2021, which is a continuation of application No. 17/359,416, filed on Jun. 25, 2021.

(51) Int. Cl.
*E21B 47/09* (2012.01)
*G01S 15/08* (2006.01)
(Continued)

(52) U.S. Cl.
CPC .............. *E21B 47/09* (2013.01); *E21B 34/06* (2013.01); *E21B 47/002* (2020.05); *F16K 37/00* (2013.01); *G01S 15/08* (2013.01)

(58) Field of Classification Search
CPC ....................................................... G01S 15/08
See application file for complete search history.

(56) References Cited

U.S. PATENT DOCUMENTS 1,395,826 A * 11/1921 Hopkins ................ G08B 25/00
340/3.4
3,913,883 A * 10/1975 Irwin ..................... E21B 34/04
251/25

(Continued)

FOREIGN PATENT DOCUMENTS

CA 2280208 A1 * 3/2000 ......... E21B 33/0355

OTHER PUBLICATIONS

Office Action issued in related U.S. Appl. No. 17/359,416 dated Aug. 9, 2022 (23 pages).

(Continued)

*Primary Examiner* — Nabil H Syed
*Assistant Examiner* — Cal J Eustaquio
(74) *Attorney, Agent, or Firm* — Osha Bergman Watanabe & Burton LLP

(57) ABSTRACT

Embodiments of the present disclosure relate to an apparatus, a system, and a method for detecting and indicating the operational position of a valve of wellsite equipment. The apparatus comprises a mount portion and a housing portion. The mount is operatively coupled to a non-moving part of the valve and the housing portion is configured to receive a sensor therewithin. The sensor is configured to detect the position of a moving part of the valve and to provide an output signal indicative of the position of the moving part of the valve. The position of the moving part of the valve is indicative of the operational position of the valve. The system comprises one or more such apparatus for detecting and indicating the operational position of one or more valves on a wellsite or well pad.

18 Claims, 10 Drawing Sheets

(51) Int. Cl.
*E21B 47/002* (2012.01)
*E21B 34/06* (2006.01)
*F16K 37/00* (2006.01)

(56) References Cited

U.S. PATENT DOCUMENTS

| | | | | |
|---|---|---|---|---|
| 5,159,835 | A | * | 11/1992 | Nafziger ................ F16K 37/00 137/554 |
| 2002/0106247 | A1 | * | 8/2002 | Russell ................ F16L 55/124 137/317 |
| 2005/0075817 | A1 | * | 4/2005 | Kah .................... F16K 31/1262 702/108 |
| 2016/0077531 | A1 | | 3/2016 | Kucera et al. |
| 2017/0176991 | A1 | | 6/2017 | Hoskeri et al. |
| 2017/0232285 | A1 | | 8/2017 | Magee |
| 2018/0045319 | A1 | | 2/2018 | Michaelsen et al. |
| 2020/0102893 | A1 | * | 4/2020 | Berry ................ F16K 37/0083 |
| 2020/0240266 | A1 | | 7/2020 | Hunter et al. |

OTHER PUBLICATIONS

Office Action issued in related U.S. Appl. No. 17/519,247 dated Aug. 9, 2022 (23 pages).
Office Action issued in related U.S. Appl. No. 17/519,247 dated Feb. 7, 2023 (21 pages).

* cited by examiner

FIG. 1A
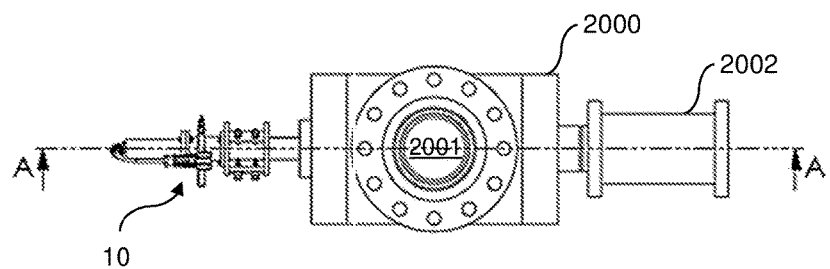
FIG. 1B
FIG. 1C
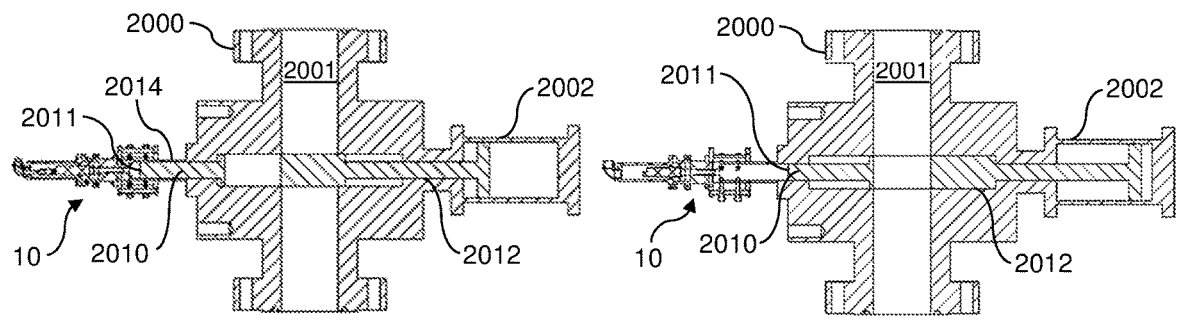
FIG. 1D
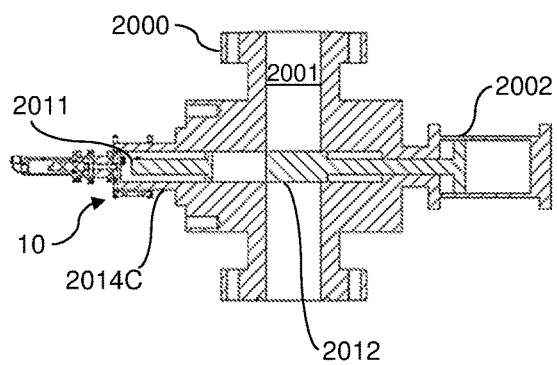
FIG. 1E
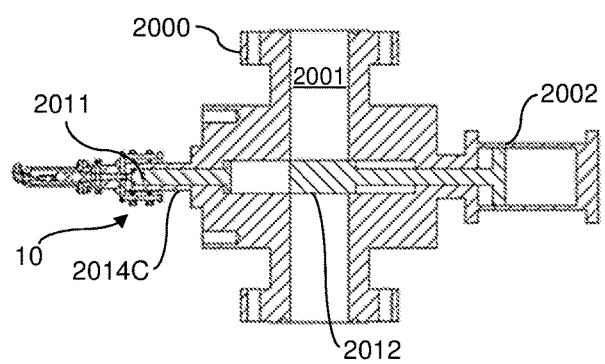

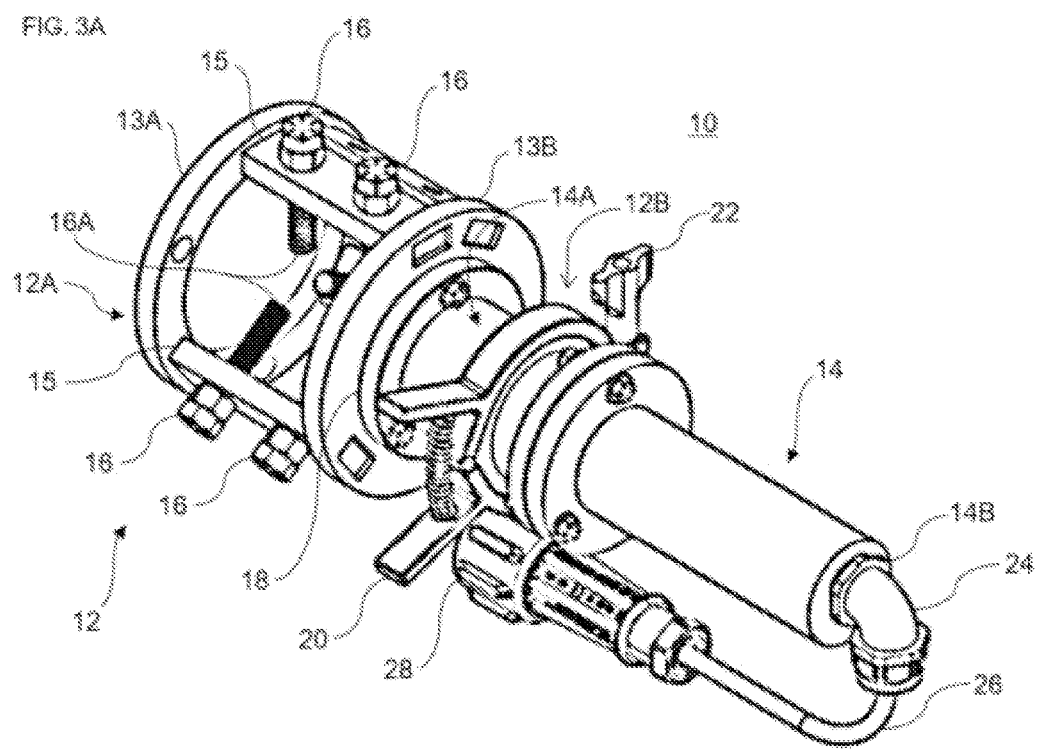
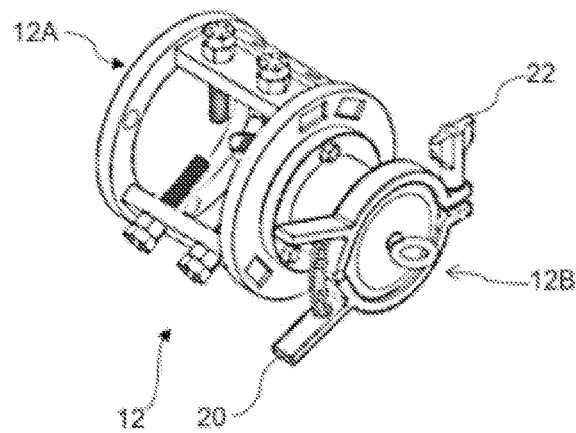
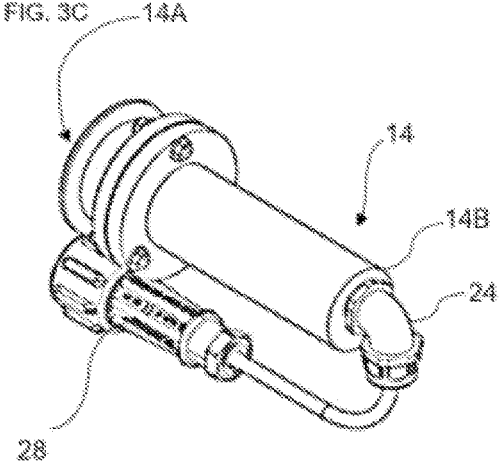

APPARATUS, SYSTEM, AND METHOD FOR INDICATING A POSITION OF VALVE OF WELLSITE EQUIPMENT

TECHNICAL FIELD

This disclosure generally relates to wellsite equipment. In particular, the disclosure relates to an apparatus, system, and method for detecting and indicating a position of a valve of wellsite equipment.

BACKGROUND

The oil and gas industry is increasingly incorporating digitalization to assist in production monitoring and decision making at a wellsite and on a well pad. When hydrocarbon recovery includes hydraulic fracturing, or otherwise, one of the key pieces of information at the wellsite is to know the operational position of the valves on the frac tree and/or zipper manifold and/or other wellsite equipment. It is critical to know whether a valve is open, closed, or in a position in between. Currently, service operators send an individual to visually check the position of a valve actuator. This may require the individual to enter or pass through one or more hazardous areas of the well pad. In other instances, service operators may use some form of reporting technology for obtaining valve position information that is typically either mounted to the frac-head valve itself or permanently installed on a specialized accumulator.

One drawback of mounting equipment on the frac tree is that the differences in valves, including from different vendors or suppliers, necessitates different mounting hardware for different valves, which can be inefficient, of large physical dimensions and costly for installation. For example, this can be accomplished by machining and modifying each valve for a position detection assembly to be mounted on, which is costly and inefficient as many valves need to be modified in order to have enough in circulation to supply for jobs. Another example is installing a temporary solution, however the types that have been developed are exceedingly long due to their shaft contact design for providing contact-based positon detection.

A drawback of permanently installed valve-position equipment, as an integral part of a specialized accumulator or otherwise, is that the information acquired from this equipment may not be readily shared by vendors or suppliers with other services requiring it. Not having or sharing all of the data negates, to a certain degree, the usefulness of the valve position information because different service operators on a wellsite may require the valve position information at a given time, but only some may be able to access it. Furthermore, such specialized equipment is costly; particularly, when one considers that the specialized unit would likely replace an existing, non-specialized unit that performs the same functions properly.

Therefore, a need exists for an improved way to obtain valve position information at the wellsite or well pad.

SUMMARY

The embodiments of the present disclosure relate to an apparatus, system, and method for indicating a position of a valve of wellsite equipment.

Some embodiments of the present disclosure provide an apparatus for detecting and indicating a position of a valve of wellsite equipment. The apparatus comprising a sensor that is configured to detect the position of a moving part of a valve and to provide an output signal indicative of the position of the moving part.

A system for detecting and indicating an operational position of a valve, the system comprising: an apparatus and a processor. The apparatus comprising a first end that configured to operably couple to a valve or associated equipment and a second end and a sensor. The sensor housed between the first end and the second end, the sensor configured to be in communication with a target surface for contactless detecting of the operational position of the valve based upon the detected distance between the sensor and the target surface and the sensor further configured to indicate the operational position by communicating an output signal. The processor is configured to receive the output signal and to generate a display signal that indicates the operational position of the valve.

An apparatus for detecting and indicating an operational position of a valve. The apparatus comprises: a first end that configured to operably couple to a valve or associated equipment and a second end. The apparatus also comprises a sensor housed between the first end and the second end, the sensor configured to be in communication with a target surface for contactless detecting of the operational position of the valve based upon the detected distance between the sensor and the target surface.

Some embodiments of the present disclosure relate to a method A method for detecting and indicating an operational position of a valve, the method comprising: securing an apparatus to a valve or associated equipment, the apparatus comprising a sensor, detecting the distance between the sensor and a target surface of the valve or associated equipment; and indicating the operational position of the valve actuator based on the detected distance.

Without being bound by any particular theory, the embodiments of the present disclosure provide an apparatus, system, and method that generate information about the position of a valve. Knowing the position of the valve provides information about flow of fluids towards, through or away from an accumulator of a wellsite or well pad hydraulic system, a frac flow control unit, a frac zipper-manifold, a frac tree, a well Christmas tree, a blowout preventer, or therebetween. Such information about fluid flow may help avoid accidents at the wellsite and/or well pad. Examples of such accidents can include when a wellhead valve is opened or closed at the incorrect time during a well operation, such as a hydraulic fracking operation or a wireline operation. Furthermore, some embodiments of the present disclosure permit aggregating, displaying and sharing of valve position information between different individuals working on the same wellsite and multiple wellsites of a given well pad and individuals who are overseeing operations of multiple wellsites from a remote location. Furthermore, the embodiments of the present disclosure can be added on to existing wellsite equipment without great effort, which facilitates the sharing of valve position information across individuals with access to different computer systems and different information technology infrastructures. In effect, the embodiments of the present disclosure are agnostic to the types, sizes, dimensions and configuration of valves present at the wellsite and to the specific computer and data systems that individuals may already be using in relation to wellsite operations.

BRIEF DESCRIPTION OF THE DRAWINGS

These and other features of the present disclosure will become more apparent in the following detailed description in which reference is made to the appended drawings.

FIG. 1 shows an apparatus, according to embodiments of the present disclosure, for use with a wellhead valve, wherein FIG. 1A is a top-plan view; FIG. 1B is a cross-sectional view taken through line A-A in FIG. 1A; FIG. 1C is a cross-sectional view taken through line A-A in FIG. 1A; FIG. 1D is a cross-sectional view taken through line A-A in FIG. 1A; and FIG. 1E is a cross-sectional view taken through line A-A in FIG. 1A.

FIG. 2 shows further embodiments of the apparatus, wherein

FIG. 3 shows an apparatus, according to embodiments of the present disclosure, wherein FIG. 3A is an isometric view of the apparatus; FIG. 3B is an isometric view of a mount portion of the apparatus; and, FIG. 3C is an isometric view of a housing portion of the apparatus.

FIG. 4 shows further views of the apparatus of FIG. 3, wherein

FIG. 5 shows another embodiment of an apparatus, according to the present disclosure, wherein

DETAILED DESCRIPTION

Figure 2A:
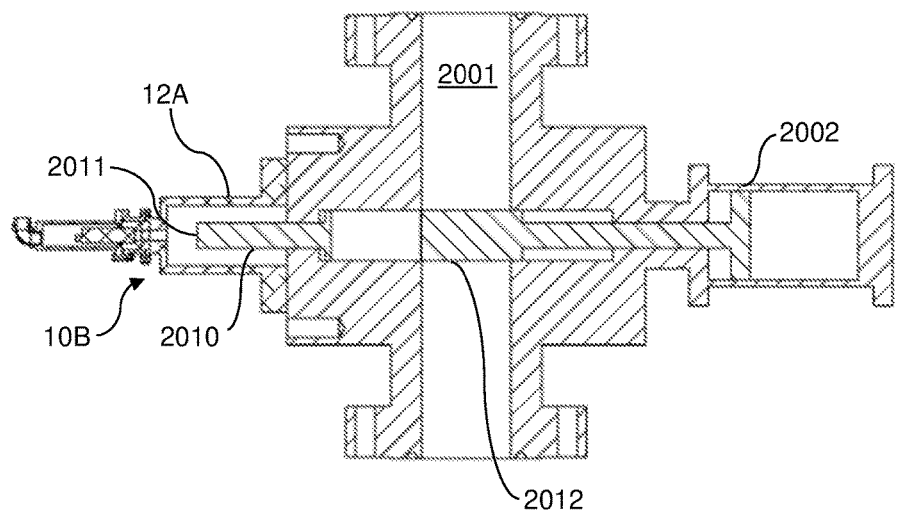
FIG. 2A shows a mid-line cross-sectional view of the apparatus in use with a wellhead valve; and, FIG. 2B shows a top-plan view of the apparatus in use with a rotationally actuated wellhead valve.

The embodiments of the present disclosure relate to an apparatus, system, and method for detecting and indicating an operational position of a valve of that controls the flow of fluids to, through or away from wellsite equipment. As used herein, the expression "wellsite equipment" refers to a component of or a piece of equipment that can be used or is used at a wellsite. The valve can occupy various operational positions that regulate the flow of fluids through the valve so as to influence the operation of the wellsite equipment or so as to control the flow of fluids upstream or downstream of the wellsite equipment. For example, the valve can be, but is not limited to: a swab valve, a pump-down valve, a crown valve, an isolation valve, a hydraulic master-valve, one or more side port valves, one or more zipper manifold valves, a flow-back valve, a pump-down valve and any other valve that contributes to the functionality of wellsite equipment. Regardless of its position and function on the wellsite, the valve may be a butterfly valve, a plug valve, a ball valve, a low-torque valve, a low-torque plug valve, a gate valve, a wedge gate valve, a disc and stem valve or any other type of valve that can be actuated by an actuator.

A number of different control mechanisms regulate the flow of fluids to, through and from the well. For example, moving parts of valves within wellsite equipment can change operational position, by opening and closing, to control the flow of fluids to and from the well. For example, a number of valves may be positioned through different sections of a surface-borne, hydraulic fracturing system or other systems relate to services being performed on the well. The operational position of each valve is controlled by a valve actuator. Valve actuators can control the operational position of a valve through one or more of manual, hydraulic, pneumatic or electronically actuated control mechanisms. Some valve actuators may provide direct control of a valve and some valve actuators may be positioned remotely from the valve for indirect control of the operational position of a valve.

Some embodiments of the present disclosure relate to an apparatus, system and method for detecting and indicating the position of a valve of wellsite equipment. For the purposes of this disclosure, the term "detecting" and similar terms, refer to capturing positional information of a movable part of the valve, relative to a fixed point. The embodiments of the present disclosure relate to detecting the distance between a non-moving sensor and a target surface of a moving part of the valve without directly contacting the moving part of the valve (i.e. non-contact detection). As will be appreciated by those skilled in the art, the sensor may also be operatively coupled to the moving part of the valve and the target surface may be a surface of a non-moving part of the valve, a surface of the wellsite equipment, a surface of the apparatus described herein or combinations thereof. Furthermore, the embodiments of the present disclosure allow for detecting the position of a moving part of a valve throughout the entire range of intended motion and beyond. This allows a user to know the location of the moving part of the valve within its intended range of movement (e.g. 25% towards a closed position, 25% towards an open position, 50% from closed and open positions). If the moving part of the valve is detected to be outside of its intended range of movement, that may indicated maintenance or repair of the valve is required and/or that the apparatus may require an adjustment, recoupling or replacement. Detecting the position of a moving part of the valve can be a direct or indirect measure of the operational position of the valve. For the purposes of this disclosure, the term "indicating" and similar terms, refer to conveying the detected position of the moveable valve part.

Some embodiments of the present disclosure relate to an apparatus that is operatively coupleable to a non-moveable part of a valve or associate wellsite equipment. The apparatus includes a sensor for detecting the position of a moving part of the valve wherein the moving part of the valve operates to, directly or indirectly, change the operational position of the valve. The sensor is also configured for generating an output signal that indicates the position of the moving part of the valve and, therefore, the operational position of the valve. When the apparatus is operatively coupled to the non-moving part of the valve, the apparatus may detect and indicate whether the valve is in a first position, a second position, or an intermediate position therebetween. The apparatus may also detect and indicate whether the valve has moved to a position beyond its intended range of movement, which may indicated maintenance, repair or replacement of the valve is required and/or that the apparatus requires an adjustment, recoupling or replacement. Moving the valve between these operational positions will permit, restrict, or stop at least a portion of fluids from flowing to, through or from the valve.

Some embodiments of the present disclosure relate to a system for detecting and indicating the position of a valve that forms part of wellsite equipment. The system comprises an apparatus with a sensor and a processor. The apparatus is operatively coupleable to a non-moving part of the valve and the sensor is configured to receive to detect and indicate the position of a moving part of the valve. The sensor is also configured to generate and communicate an output signal indicative of the operational position of the valve. The processor is operatively coupled to the at least one sensor and the processor is configured to receive and process an output signal from the sensor. The processor is further configured to generate the processed output signal as a display signal. In some embodiments of the present disclosure, the system further comprises a remote display unit for receiving the display signal and for generating a display that is indicative of the position of the valve. In some embodiments of the present disclosure, the remote display unit may form part of a Human-Machine-Interface (HMI) and/or the remote display unit may be part of an individual computer display. In some embodiments of the present disclosure, the system includes multiple apparatus that each provide their respective output signals to a single processor (or to multiple processors in communication with each other) so that the remote display unit can receive display signals that indicate the operational position of multiple valves at a wellsite or a well pad at a given time.

Some embodiments of the present disclosure relate to a method of detecting and indicating a position of a valve that forms part of wellsite equipment. The method comprises the steps of coupling an apparatus to a non-moving part of a valve, detecting the operational position of the valve by detecting the position of a moving part of the valve and observing an output signal generated by the sensor.

As discussed elsewhere herein, several issues and/or inefficiencies exist with conventional technologies for indicating the position of a valve at a wellsite. For example, knowing the operational position of a valve that controls the flow of fluids towards, through or from a piece of wellsite equipment may be beneficial to the safe and efficient wellsite operations by letting one or more operators know the operational position of the valve, so as to know the operational state of the wellsite equipment.

The technology of the present disclosure is suitable for several applications and use with different types of wellsite equipment. With reference below to the drawings herein, the present disclosure discusses the technology in the context of indicating the operational position of a valve and the skilled person will appreciate that various applications and wellsite equipment uses are applicable. For example, the embodiments of the present disclosure can be used for detecting and indicating the operational position of a valve of at least the following wellsite equipment: a frac flow control unit, a frac zipper-manifold, a frac tree, a wellhead Christmas tree, a blowout preventer, or any valve therebetween.

Unless defined otherwise, all technical and scientific terms used herein have the same meaning as commonly understood by one of ordinary skill in the art to which this disclosure belongs. Exemplary terms are defined below for ease in understanding the subject matter of the present disclosure.

As used herein, the term "about", when referring to a measurable value, refers to an approximately +/−10% variation from a given value. It is understood that such a variation is always included in any given value provided herein, whether or not it is specifically referred to.

As used herein, the term "and/or" refers to and encompasses any and all possible combinations of one or more of the associated listed items (e.g. one or the other, or both), as well as the lack of combinations when interrupted in the alternative (or).

As used herein, the term "accumulator" refers to equipment that forms part of a wellsite hydraulic system that is used for opening and closing valves and blowout preventers of wellsite equipment. Accumulators typically have four components: a hydraulic pump, a hydraulic tank, accumulator bottles for storing hydraulic energy and valves for regulating the hydraulic equipment. An accumulator may also be referred to as a closing station or a closing unit. An accumulator may also control the position of a valve actuator of each of the frac tree valves and/or the zipper manifold valves.

As used herein, the term "consultant" refers to a representative of an exploration-and-producing oil company who may be present at the well pad or remote from the well pad and duly authorized to make procedural decisions about operations at the well pad or multiple well pads.

As used herein, the term "frac tree" refers to an assembly of valves, gauges and chokes that are part of a wellhead and used for the fracturing process. The frac tree can include multiple valves that control the flow of fluids through, to or from the well, to control pressure between different sections of the wellhead.

As used herein, the term "wellhead" refers to the equipment and components present at the surface end of a well that may include a frac tree, a Christmas tree, a blowout preventer assembly, and that at least partially provides physical support to the well below the surface end.

As used herein, the term "wellhead technician" refers to an individual person who actuates the valves on a wellsite, whether the valves are hydraulically, electronically, pneumatically or manually actuated, directly or indirectly.

As used herein, the term "well pad" refers to a physical location that comprises two or more wellsites and such wellsites are in proximity to each other to facilitate the sharing of wellsite equipment, personnel and/or other operational infrastructure for operations to be performed on such wellsites.

As used herein, the term "wellsite" refers to a physical location in proximity to one or more geological formations and where well operations are occurring on an oil and/or gas well.

As used here, the term "zipper manifold" also referred to as a "frac zipper manifold" refers to a manifold that is used for conducting and directing high-pressure, hydraulic fracturing fluid from a source into one or more wells on a well pad. Zipper manifolds can include hydraulically actuated or manually actuated valves that regulate the fluid flow within the manifold. Zipper manifold may also be used interchangeably with the terms "frac line" or "trunk line".

Figure 10:
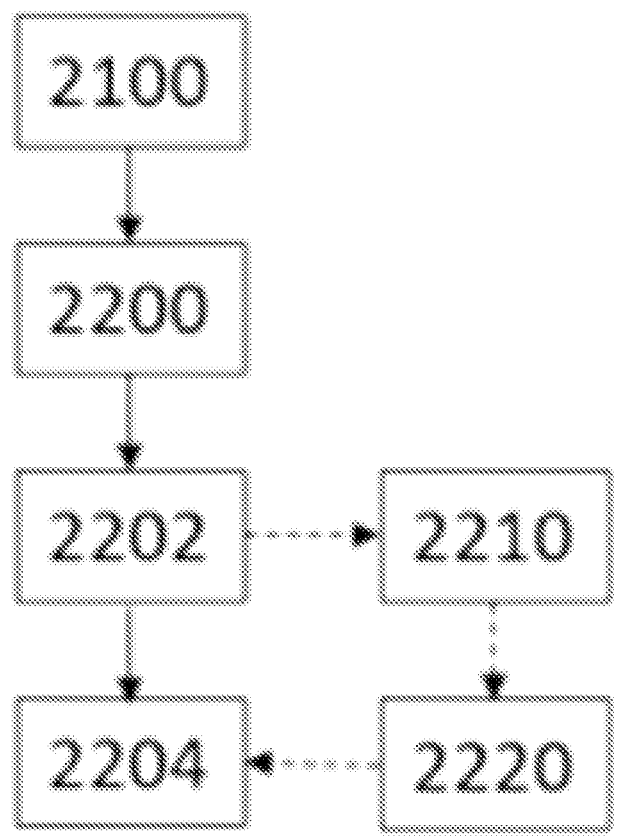
FIG. 10 shows steps of a method for detecting and indicating the operational position of a valve.

The embodiments of the present disclosure will now be described and in reference to FIG. 1 through to FIG. 10.

FIG. 1 shows a non-limiting example of an apparatus 10 that is configured to detect and indicate the operational position of a wellhead valve 2000. The wellhead valve defines a central bore 2001 which the valve body 2012 can move between a closed position (FIG. 1B) and an open position (FIG. 1C). The valve body 2012 can move linearly between the closed and open position under the influence of an actuator 2002, which in FIG. 1 is a hydraulic actuator. When the valve body 2012 moves, a valve stem 2010 moves in the same fashion and direction so that a target surface 2011 of the valve stem 2010 will move towards and away from the apparatus. The valve stem is protected within a valve guard 2014, which may also be referred to as a valve shroud.

The apparatus 10 can be operatively coupled to a non-moving portion of a valve, a surface of wellsite equipment so that a sensor 50 of the apparatus 10 is in fluid communication and, therefore, acoustic communication and/or visual communication and/or electromagnetic communication with the target surface 2011 of the valve. As shown in the comparison of FIG. 1B the apparatus 10 can be operatively coupled at one end to the valve guard 2014. As shown in FIG. 1B, 1C, 1D, and 1E, the apparatus 10 is configured to operatively couple to valve guards 2014 and 2014C (as but one example of a non-moving part of the valve) of various shapes, dimensions and configurations without requiring effort to pre-measure the valve guard and then to manufacture a specific apparatus that meets the specific valve guard to which the apparatus 10 is intended to be operatively coupled. Without being bound by any particular theory, the apparatus 10 is configured to be operatively coupled to a non-moving part of the valve (which also refers to other non-moving surfaces of the wellsite equipment) to accommodate outer diameter (or similar external diameters for non-circular components) between 0.25-25 inches, 0.5-20 inches, 0.75-15 inches, 1-10 inches, 1.5-7.5 inches, 2-5 inches and all ranges of sizes therebetween.

FIG. 2A shows another embodiment of the apparatus, referred to as apparatus 10B, which has all of the same components, features and functionality of apparatus 10 (described further below) with the exception that the apparatus 10B includes a fitted valve guard 12A as part of the apparatus 10B. This fitted valve guard 12A can be operatively coupled with and sealed against the other components of the valve and/or wellsite equipment so as to prevent fluid and debris intrusion that may interfere with the valve's movement.

Figure 2B:
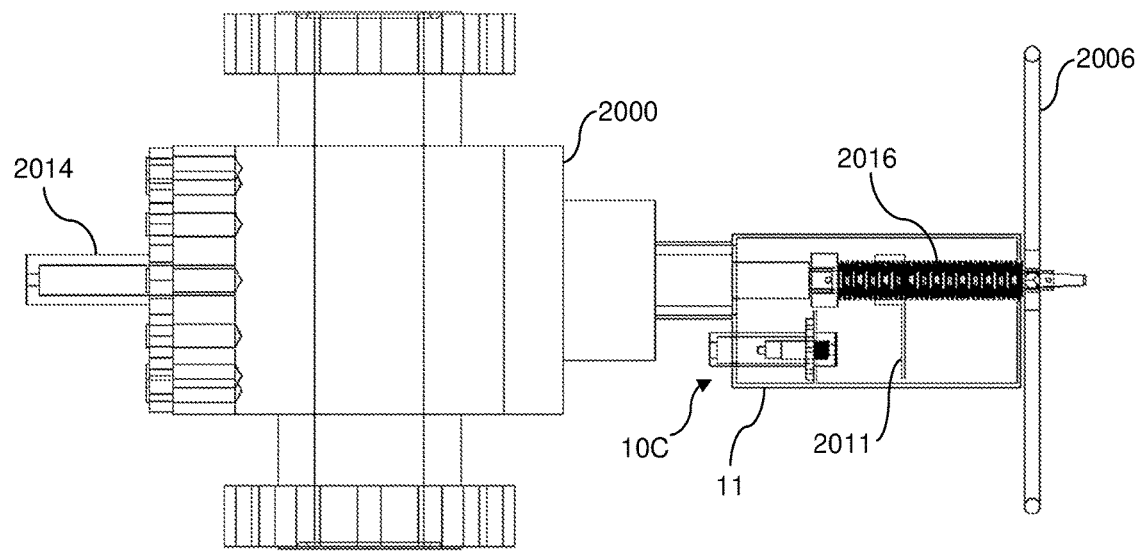

FIG. 2B shows another embodiment of the apparatus, referred to as apparatus 10C, which has all of the same components, features and functionality of apparatus 10 (described further below) with the exception that the apparatus 10C is configured to be used with a rotationally actuated (rather than linearly actuated) valve. The apparatus 10C further comprises a housing 11 that can be positioned adjacent the rotary actuator 2006 (in this case a wheel handle). The apparatus 10C also includes a target surface 2011 that can be operatively coupled to the rotational actuator shaft 2016 (in this case the threaded member upon which the rotary actuator 2006 rotates). In this embodiment, as the rotary actuator 2006 moves towards or away from the apparatus 10C the target surface 2011 will move linearly towards and away from the apparatus 10C but with minimal or no rotation, which allows the apparatus 10C to detect the position of a moving part of the valve in a contactless fashion.

Without being bound by any particular theory, the embodiments of the present disclosure allow for contactless (i.e. non-contact) detection of the position of a moving part of a valve. The benefits of contactless detection is that the apparatus 10 can be more compact (i.e. occupy a smaller physical space) and, therefore, more stable than currently available contact-based position sensors. This is an important feature when the embodiments of the present disclosure are deployed on a wellsite because the compact physical footprint will mitigate inadvertent accidents caused by contacting other equipment that is being moved around the wellsite. Furthermore, the apparatus 1—can be positioned in such a manner as to be closer to the valve, which may provide the benefit of a reduced cantilever as the apparatus extends outwardly from the valve. Furthermore, the contactless detection of the position of the moving part of the valve provided by the embodiments of the present disclosure may also reduce the wear and tear of the components of the present disclosure.

FIG. 3 shows the apparatus 10 as comprising 10 has a first end 12A and an opposite second end 14B. The first end 12A is configured to be operatively coupled to a non-moving part of a valve (as shown in FIG. 1 and FIG. 2). Some non-limiting examples of such non-moving parts of the valve include a valve bonnet, a stem shroud, a valve body, a flange, a yoke and the like. Furthermore, for the purpose of this disclosure, the term "non-moving part(s) of the valve" is also understood to include other surfaces of the wellsite equipment of which the valve is a functional component. Because the non-moving part of the valve can vary based on the type of well site equipment, type of valve, equipment/valve manufacturer, equipment/valve model and the like, the first end 13A can be of various dimensions to operatively couple the first end 12A of the apparatus 10 to the non-moving part of the valve. The adaptability of the first end 12A of the apparatus 10 to take various configurations and dimensions allows the apparatus 10 to be used on valves of different shapes, dimensions and configurations.

In some embodiments of the present disclosure, the apparatus 10 includes a mount portion 12, which may also be referred to as a mount and mounting portion, and a housing portion 14. The mount 12 may define the first end 12A of the apparatus 10 and the housing portion 14 may define the second end 14B of the apparatus 10.

In some embodiments of the present disclosure, the mount 12 may comprise a ring plate 13A that defines an inner aperture. The diameter of the inner aperture can be of such a dimension that it is able to be positioned about a portion of the non-moving part of the valve. The first end 12A may also include a coupling mechanism that removably couples the first end 12A about the non-moving part. FIG. 3 shows the non-limiting example of brace members 15 that are connected at one end to the ring plate 13A, extending away therefrom. The brace members 15 each define one or more apertures for receiving a coupling member 16 therethrough. FIG. 3A and FIG. 3B each show the non-limiting examples of coupling members 16 as being threaded members with a first end 16A that can be positioned to abut against a surface of the non-moving part and tightened thereagainst in order to removably couple the first end 12A to the non-moving part of the valve. As will be appreciated by those skilled in the art, the dimensions and manner by which the mount 12 is operatively coupled to the non-moving part can be varied and is not limited by the examples provided in this disclosure. For example, the mount 12 may completely encircle about a portion of the non-moving part of the valve or not. The removable coupling performed by the mount 12 need only be strong enough so as to maintain the position of the apparatus 10 relative to the moving part of the valve for the time frame during which it is desirable to know the operational position of the valve while the apparatus 10 is exposed to the environment of the wellsite.

Figure 4A:
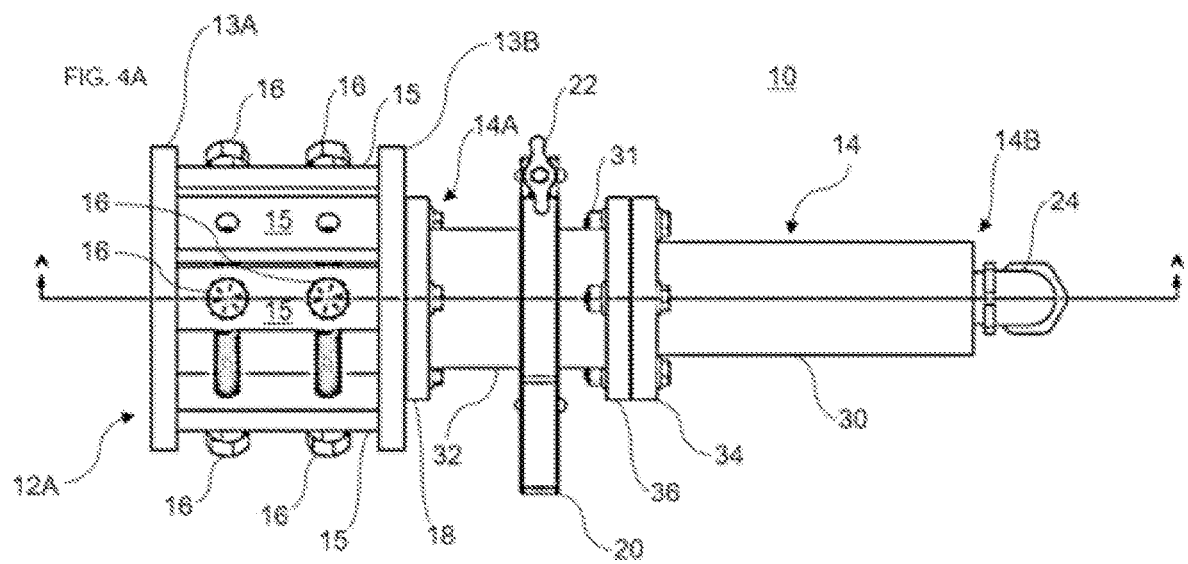
FIG. 4A is a top-plan view of the apparatus.
Figure 4B:
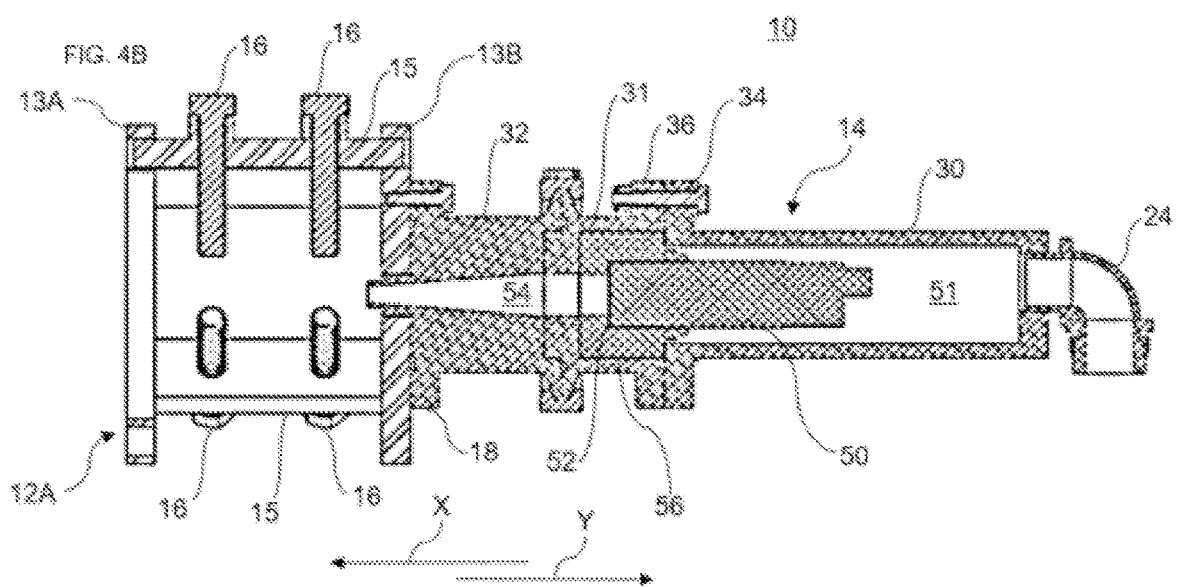
FIG. 4B is a cross-sectional view taken through the line A-A in FIG. 4A.

The housing portion 14 refers to a part of the apparatus 10 that encloses and/or protects and/or couples to and/or otherwise retains a sensor 50 in a given, fixed position relative to the non-moving part of the valve. The housing portion 14 is configured to receive the sensor 50 therewithin. By "configured to receive" it is meant that the structure of the housing portion 14 allows for at least a portion of the sensor 50 to be enclosed and/or protected and/or coupled to and/or otherwise retained by the housing portion 14. For example, the housing portion 14 may define an interior space 51 of suitable size and shape to accommodate at least a portion of the sensor 14 (see FIG. 4).

The apparatus 10 may be monolithic or modular. For example, the mount 12 and the housing portion 14 may be formed as a single monolithic component or as separate modular portions that together form the apparatus 10. For example and as shown in the non-limiting embodiment illustrated in FIG. 3, the mount 12 and the housing portion 14 may be separate and distinct pieces that can be removably coupled together. Non-limiting examples of this modular form of the apparatus 10, the mount 12 and the housing portion 14 may be coupled together by a flanged connection made up a second ring plate 13B of the mount 12 and corresponding flange plate 18 that forms part of the housing portion 14. The second ring plate 13B and the flange plate 18 are removably coupled together by one or more securing members such as screws, pins, shanks, bolts or combinations thereof. Without being bound by any particular theory, when the mount 12 and the housing portion 14 are modular, that can allow an user of the apparatus the ease of having different mounts 12 of various dimensions and configurations available to best ensure that the apparatus 10 can be removably coupled to the non-moving part of the valve in a desired fashion.

The apparatus 10 may be of any material suitable for withstanding the wellsite environment. In some embodiments, portions of the apparatus 10 is made of metal or a metallic alloy such as steel, including conventional steel or high-tensile steel. In some embodiments of the present disclosure, portions of the apparatus 10 are made of plastic, a polymer or a polymer blend. The mount 12 and the housing portion 14 can be made of the same material or not.

The housing portion 14 is configured to receive the sensor 50. The housing portion 14 may receive the sensor 50 entirely therewithin, or not. In some embodiments of the present disclosure, the sensor 50 is removably couplabled to the housing portion 14.

The sensor 50 is configured to detect the position of a moving part of the valve and to provide an output signal that indicates the operational position of the valve relative to a fixed reference point. Examples of sensors 50 that are suitable for use in the apparatus, system, and methods of the present disclosure include any type of sensor that can detect the distance between the sensor 50 and a target surface, which is preferably a surface of the moving part of the valve, but may also be a non-moving surface of the valve if the sensor 50 is operatively coupled to the moving part of the valve. A non-limiting example of such a sensor is a time of flight (TOF) sensor. In some embodiments of the present disclosure, the TOF sensor may be an ultrasonic TOF sensor assembly that comprises an ultrasonic sound source, an ultrasonic sound detector and a processor. While known in the art, such an ultrasonic (TOF) sensor operates by the sound source emitting ultrasonic soundwaves at a target which reflects the soundwaves. The reflected soundwaves are detected by the ultrasonic sound detector. The microprocessor compares the time differential between when the emitted soundwaves are emitted and when the received soundwaves are received to determine the distance between the emitter and the target. The microprocessor then converts this time differential into a time differential output signal that is then communicated externally to the apparatus 10 as either a voltage signal or a current signal. The microprocessor may also compensate for other factors such as noise and temperature to improve the accuracy of the distance calculations.

As will be appreciated by those skilled in the art, TOF sensors other than ultrasonic TOF sensors are also contemplated herein, such as laser TOF sensor assembly, LIDAR TOF sensor assembly, a radar TOF sensor assembly or combinations thereof. As will be appreciated by those skilled in the art, other types of sensors are also contemplated herein, such as a string pot sensor assembly, a rotary potentiometer/rotary encoder, a linear variable differential transformer (LVDT) sensor assembly, a limit switch assembly, a magnetic pick-up sensor assembly or combinations thereof.

As shown in the non-limiting illustration of FIG. 3, the housing portion 14 may also define the inner surface of an optional focusing tube 54. The focusing tube 54 may comprise at least a portion of which that has a conical cross-sectional shape. As shown in FIG. 32, the first end of the focusing tube 54 that is proximal the mount 12 may have a smaller cross-sectional area than the opposite, second end of the focusing tube 54 that is proximal the sensor 50. Without being bound by any particular theory, the conical cross-sectional shape of the focusing tube 54 may focus the soundwaves within the focusing tube travelling in one direction and filter soundwaves in the other direction, which may enabling the sensor 50 to determine the position of the target through a smaller aperture than other designs allow for. In some embodiments of the present disclosure, the inner surface of the housing portion 14 can be shaped, for example by machining or otherwise, to define the cross-sectional shape of the focusing tube 54. Alternatively, an insert body may be fixed within the housing portion 14 and the insert body will include an inner surface that defines the cross-sectional shape of the focusing tube 54.

In some embodiments of the present disclosure, the housing portion 14 may be monolithic or modular. As shown in the non-limiting illustration of FIG. 4, the housing portion 14 can comprise three separate modular components, namely a first end component 32, a second end component 30 and an intermediate component 31.

The first end component 32 may include the flange plate 18 and be removeably couplable to the mount 12 as described herein above.

The second end component 30 may define an inner plenum 51 in which at least a portion of the sensor 50 is received and through which electronic cables (not shown) can extend from the sensor 50 out through a cable extension 24 via a cable conduit 26 to terminate in a cable connector 28. The electronic cables are configured to conduct electronic signals, electronic power or both to and from the sensor 50. The cable connector 28 can be a multi-pin connector that is configured to operatively connect the electronic cables within the plenum 51 to provide external power and/or communication channels. In some embodiments of the present disclosure, the sensor 50 may be powered by a battery and the sensor 50 may be configured to wirelessly communicate the output signal generated by the microprocessor and to receive wireless commands from a user.

The intermediate component 31 can be removably connected to the second end component 30 by flanges 34 and 36 and connection members that extend therethrough. The intermediate component 31 may also include a fixing body 56 that is configured to protect the sensitive electronic components of the sensor 50, to maintain the orientation of the sensor 50 within the housing portion 14 and, optionally, to define a portion of the focusing tube 54. In some embodiments of the present disclosure, the fixing body 56 also reduce external interference, such as noise and thermal fluctuations, with the operation of the sensor 50. The intermediate component 31 may also removably connect with the first end component 32. In some embodiments of the present disclosure, a quick release connection may be used to removably connect the intermediate component 31 and the first end component 32. The quick release connection may include a biased clamp member 20 and a retention member 22. The biased clamp member 20 can include a biasing member that forces two opposing handles away from each other, which in turn creates an inward compression force that acts upon a portion of the intermediate component 32 and the first end component 32. The retention member 22 can be used to lock the biased clamp member 20 in a desired position, so as to maintain the clamping force. In order to release the clamping force, the retention member 22 can be loosened and the two handles of the biased clamping member 20 can be moved towards each other to reduce or relieve the clamping force. As will be appreciated by those skilled in the art, other types of quick release connections are also contemplated by the present disclosure. Without being bound by any particular theory, the embodiments of the present disclosure that include the quick release connection may provide an operator access to maintain and/or replace the sensor 50 without having to decouple the mounting 12 from the non-moving part of the valve and without having to decouple the first end component 32 from the mount 12.

Figure 5A:
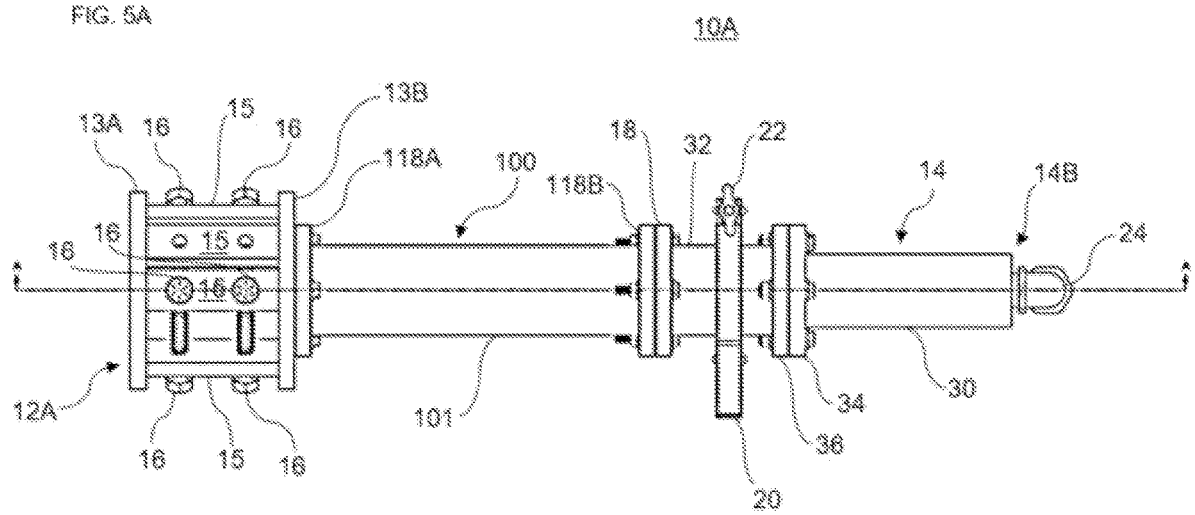
FIG. 5A is a top-plan view of the apparatus; and, FIG. 5B is a cross-sectional view taken through the line A-A in FIG. 5A.
Figure 5B:
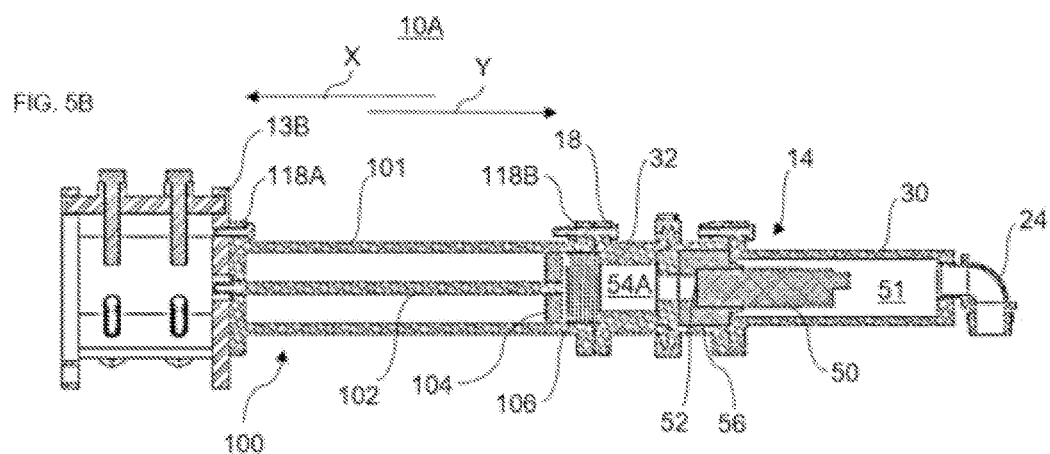

FIG. 5 shows another embodiment of the present disclosure that relates to an apparatus 10A that has the same components as described hereinabove regarding the apparatus 10 with the addition of a push rod assembly 100. The push rod assembly 100 is configured to be operatively coupled to the moving part of the valve, such that when the moving part of the valve moves to change the operational position of the valve, the push rod assembly 100 will also move and that movement can be detected by the sensor 50.

The push rod assembly 100 comprises an assembly housing 101 that is removably couplable at one end to the second ring plate 13B by a flange 118A and to the flange plate 18 of the first end component 32 by a flange 118B. The push rod assembly 10 also comprises a rod 102 and a piston cap 104 is connected to one end of the rod 102. The rod 102 and the piston cap 104 are both positioned within the assembly housing 101. The rod 102 can be inserted into a valve shroud of the valve and forced against the moving part of the valve, such as the valve stem, via a biasing member 106 that creates a biasing force that pushes the rod 102 towards the valve stem (as shown by the arrow X in FIG. 5B). In other embodiments of the present disclosure, the rod 102 is connected to the moving part of the valve by adhesive, one or more magnets, a mechanical attachment or combinations thereof, such that when the moving part of the valve moves, thus changing the operational position of the valve, the rod 102 will move similarly. Movement of the rod 102 will cause the piston cap 104 to also move and the change in position of the piston cap 104 will change the time of flight analysis conducted by the microprocessor of the sensor 50. While the focusing tube 54A is shown as not having a conical cross-sectional shape in FIG. 5B, the skilled person will appreciate that such a shape is still contemplated by this disclosure.

Without being bound by any particular theories, the push rod assembly 100 enables the sensor 50 to read the operational position of a valve that has a small aperture and/or that that otherwise would not be suitable for position detection by the sensor 50. Without being bound by any particular theory, the push rod assembly 100 translates movement of the moving part of the valve, such as but not limited to the valve stem, to movement of the piston cap 104 and the piston cap 104 provides a larger target surface against which the sensor 50 can emit and receive ultrasonic sound waves. The push rod assembly 100 also isolates the sensor 50 and the sensor read path (i.e. between the emitter and the target) from environmental issues such as water, grease, debris and ice by enclosing the rod 102 and the piston cap 104 inside the assembly housing 101.

In operation, the two apparatus 10, 10A work in a similar fashion. The sensor 50 emits ultrasonic sound waves that travel in a first direction (shown as arrow X in FIG. 4 and FIG. 5). The sound waves travel along the sensor read path through the focusing tube 54, 54A and reflect off the target surface. In the case of apparatus 10, the target surface is a surface of the moving part of the valve, such as but not limited to the valve stem. In the case of apparatus 10A, the target surface is the piston cap 104. The reflected sound waves then travel in a second opposite direction (shown as arrow Y in FIG. 3 and FIG. 4) along the sensor read path through the focusing tube 54, 54A to strike a receiving end 52 of the sensor 50. From there, the microprocessor generates the time differential output signal, as described above, and electronically communicates that externally.

As will be appreciated by those skilled in the art, the detected position of the moving part of the valve is indicative of the operational position of the valve. For example, a valve whose operational position controls the flow of fluids towards, through or away from a piece of wellsite equipment. The output signal generated by the sensor 50 may indicate that the valve is in a first operational position and, therefore, it is indicated that the valve is in an open position. When the output signal indicates the actuator is in a second operational position, the output signal will indicate that the valve is in a closed position. Actuating the valve between an open position and a closed position regulate the flow of fluids through the valve, which in turn regulates the flow of fluids towards, through or away from the associated wellsite equipment. In some embodiments, the output signal may indicate that the valve is in an intermediate operational position between the first position and the second position and, therefore, this indicates that the valve is in a partially open position and fluid flow through the valve may be partially restricted as compared to when the valve is in an open position.

Figure 6:
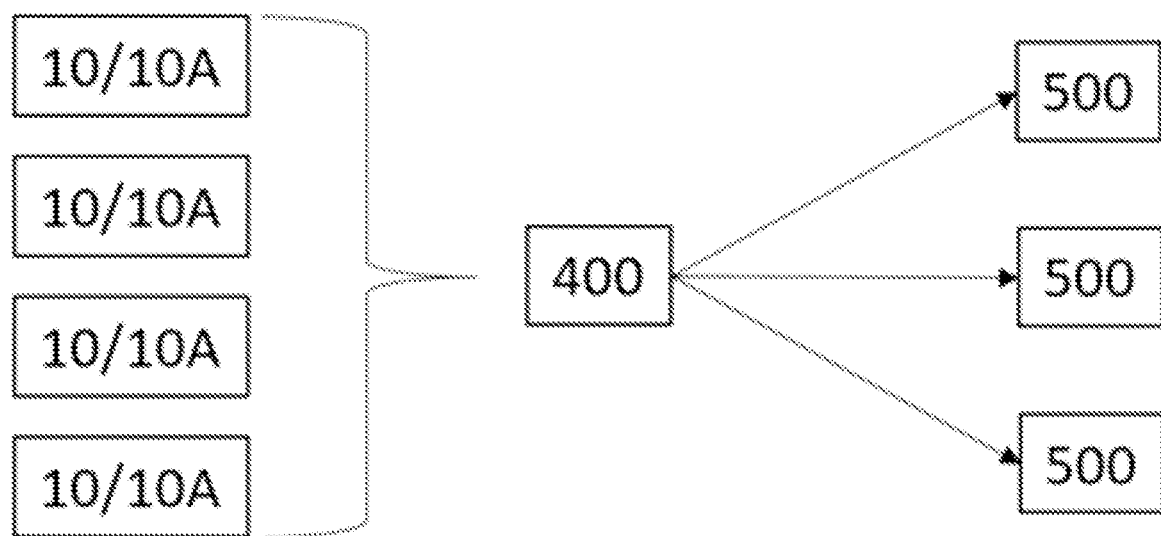
FIG. 6 shows schematic of a system, according to embodiments of the present disclosure.

Some embodiments of the present disclosure provide a system 1000 for detecting and indicating an operational position of a valve of wellsite equipment (see FIG. 6). The system 1000 comprises one or more of apparatus 10 or 10A that are each configured to detecting the position of the moving part of the valve and providing an output signal that indicates the operational position of the valve and a processor 400 for receiving and processing the output signal into a processed output signal.

As used herein, the term "processor" is intended to refer to a computing unit that executes a program. In some embodiments of the present disclosure, the program executed converts the output signal from the at least one sensor into a processed output signal. The processor 400 may be one or more single-core or multiple-core computing processors such as INTEL® microprocessors (INTEL is a registered trademark of Intel Corp., Santa Clara, Calif., USA), AMD® microprocessors (AMD is a registered trademark of Advanced Micro Devices Inc., Sunnyvale, Calif., USA), ARM® microprocessors (ARM is a registered trademark of Arm Ltd., Cambridge, UK) manufactured by a variety of manufactures such as Qualcomm of San Diego, Calif., USA, under the ARM® architecture, or the like. For the purposes of this disclosure, the term "processor" may be used to refer to multiple processors that are operatively connected to each other, for example, as sub-processors of a master processor.

In some embodiments of the present disclosure, the system 1000 actuator further comprises one or more remote display units 500 for receiving the processed signal and displaying an image indicative of the operational position of the one or more valves that each have an associated apparatus 10 or 10A. By "remote display unit" it is meant that the display unit need not be positioned at the well. For example, the remote display unit may be in a service truck, a trailer or a control center at the well site or at a control center that is at a remote location distant from the well site. The remote display unit 500 may comprise one or more display modules for displaying images, such as monitors, LCD displays, LED displays, projectors, and the like. The remote display unit 500 may be a physically integrated part of the processor 400 and/or the user interfaces (for example, the display of a laptop computer or tablet), or may be a display device physically separate from, but functionally coupled to, other components of the processor and/or the user interfaces (for example, the monitor of a desktop computer). In an embodiment, the remote display unit 500 may be a Human-Machine-Interface (HMI). At least one advantage of the remote display unit 500 is a reduction of transport of individuals to wellsite locations. Another advantage of a remote display unit 500 is that the operational position of multiple valves on multiple wellsites/well pads can be monitored by multiple users both at the wellsite/well pad and/or at a centralized control center. As will be appreciated by the skilled person, the arrows depicted in FIG. 6 represent electronic communication, wired, wireless of both, between the different components of the system 1000.

In some embodiments of the present disclosure, the system 1000 described herein may be integrated into an existing control system at a wellsite and/or at a remote location.

The program that is executable by the processor 400 can be used to map and calibrate the output signal of sensor 50 of each apparatus 10 or 10A to a respective operational position. For example, processor 400 can create a well identification number and a valve identification number for each well and valve that will be operatively connected to the system 1000. Next the operator can actuate the valve into a first operational position and then instruct the processor 400, optionally via a HMI functionality of the remote display unit 500) to add the output signal of the sensor 50 to indicate a first operational position, this is referred to as a first calibration step. The processor 400 will also assign a created well valve identification number to the valve associated with the sensor 50 that provides an altered output signal (as between prior to actuating the valve and after actuating the valve). When all valves have been associated a valve identification number, each valve will be mapped within the system 1000 and each valve identification number may then be displayed on the remote display unit 500 in such a manner that the user will be able to discern the operational position of all valves that are assigned a valve identification number. The operator may also perform the first calibration step multiple times for each valve and the program will calculate an average to assist in more precisely calibrating the output signal for the first operational position, this may be referred to as a further first calibration step. Next the operator can actuate the valve into the second operational position and then instruct the processor 400 to add the output signal of the sensor 50 as indicating the second operational position, this may be referred to as a second calibration step. The calibration of the sensor 50 output signal to indicate that the valve is in the second operational position can also be averaged over multiple adding steps by performing further second calibration steps.

If desired, depending on the specific valve function, the operator may also actuate the valve to one or more intermediate operational positions and instruct the program to add the output signal of the sensor 50 as indicating as one or more intermediate operational positions of valve. Alternatively or additionally, the program can be instructed that any output signal of the sensor 50 that is between the measure of the first operational position and the second operational signal will indicate an intermediate position.

Preferably, each sensor 50 must be calibrated to the valve it is installed on in order to provide an accurate indication of the operational position of the valve. The calibration process takes a measurement of the sensor 50 output signals in the first operational position, the second operational position or therebetween.

Optionally, the user can also use the processor 400 to apply an acceptable variance range, also referred to as a dead band, within the output signal to filter any signal noise within the sensor 50 output signal and to allow for any physical inconsistency or errors in physical positioning of the valve. For example, after following the steps above and establishing that an output signal of X (volts or current) indicates that the valve is in the first operational position and an output signal of Y (volts or current) indicates that the valve is in the second operational position, the processor can calculate the difference between X and Y to establish a range between the two output signals and applies a scale of 0-100 of the calculated range. The user can then instruct the processor 400 calculate a desired percentage of the established scale so that a signal within Z1% (on either side) of X will be indicative of the valve being in the first operational position and that a signal within Z2% of Y will be indicative of the valve being in the second operational position. Z1 need not equal Z2. The applied scale will also indicate to the user the relative percentage that a valve is open or closed, which may also be calculated (based upon inputting applicable dimensional measurements into the processor 400) to determine an actual distance that a valve is in an open operational position or a closed operational position.

Figure 7:
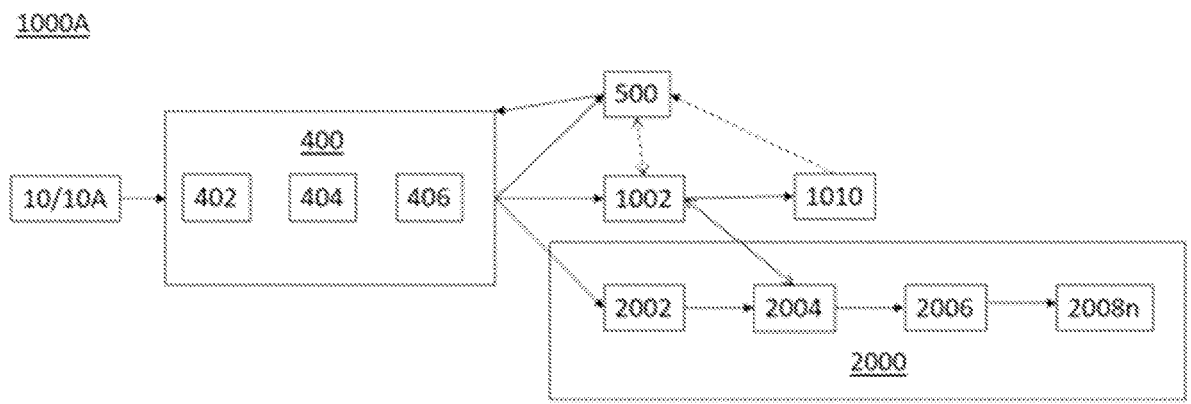
FIG. 7 shows schematic of another system, according to embodiments of the present disclosure.

FIG. 7 shows a further embodiment of a system 1000A that has the same components as system 1000, with the further components of: the processor 400 includes a digitizer 402, a microprocessor 404 and a calibration module 406. The digitizer is configured to convert the output signal from a voltage signal or a current signal to a digital signal. The microprocessor 404 is configured to process the digital signal according to the instructions provided by the program and the user. The calibration module 406 is configured to perform and calculate the calibration method described above. The system 1000A may further comprise a database module 1002 for storing all processed signal data received by the processor 400 and for delivering to such stored data to a remote database infrastructure 1010, such as a cloud-based or server based database. Optionally, the user may access the stored data directly from the remote database infrastructure 1010, via HMI features of the remote display unit 500, or indirectly through the database module 1002.

In some embodiments of the present disclosure, the system 1000A may also comprise a remote valve control (RVC) system 2000 that includes a data processor module 2002, an automation controller 2004, a remote valve actuator (RVA) controller 2006 and one or more RVA actuators 2008*n* (one for each valve that is being remotely controlled by the system 2000). The data processor module 2002 is configured to receive the data within the processed signal output from the processor 400 and to further process that data, which reflects the position that a given valve is in. The data processor module 2002 may then determine whether or not it is appropriate to change the operational position of the valve, as described further below. In event that the data processor module 2002 determines that the operational position of the valve can be changed, the data processor module 2002 may send a change position command to an automation controller 2004, which is configured to translate and direct a change operational position command to a hardware controller 2006, which in turn can cause the actuator 2008*n* to move the actuator of the valve and change the operational position of the valve, with or without a user's further intervention. In the event that the data processor module 2002 determines that the operational position of the valve should not be changed, then it can send no further commands or it can send a maintain position command to the actuator 2008*n*, via the automation controller 2004 and the hardware controller 2006.

Once each apparatus 10/10A is mapped to its associated valve, each actuator 2008*n* can also be mapped to the same valve. So that a user can use the system 1000A to receive an indication as to the operational position of a given valve and then directly actuate that valve to change its operational position. For example, each actuator 2008*n* is configured to be controlled by receiving commands remotely by a user, directly by a user or in an automated fashion under control of a controller, microcontroller, a processor or microprocessor (as described above). The actuator 2008*n* is further configured to move the actuator so as to move a valve between the first operational position, the second operational position and the intermediate operational position between the first and second positions.

Each actuator 2008*n* comprises a motor that can be electrically powered, pneumatically powered or hydraulically powered. Each type of motor has its own advantages and may be selected according to its particular application. For example, electrically powered motors are easily reprogrammable, environmentally friendly, and can be precisely and flexibly controlled. Suitable and non-limiting examples of such electrically powered motors can include direct current (DC) motors, synchronous and asynchronous motors, alternating current (AC) motors, stepper motors, and servomotors. Pneumatically powered motors are simple to use, they are durable, can provide a high-force output, and they can be used in hazardous environments. Suitable examples of pneumatically powered motors include rack and pinion actuators and rotary vane actuators. A non-limiting example of a pneumatic rotary vane actuator is a Model 07 Actuator, commercially available from Kinetrol™ LTD. Hydraulic rotary actuators can be used for applications that requiring high torque in order to move the actuator of a given valve. Common design configurations for such hydraulically powered motors include piston type, vane type, or gear type.

In some embodiments of the present disclosure, the actuator 2008*n* may comprise another mechanism than the motor for moving the actuator of the valve, such as a linear actuator or another type of rotary actuator. The linear actuator and the rotary actuator can be electrically powered, pneumatically powered or hydraulically powered.

Figure 8A:
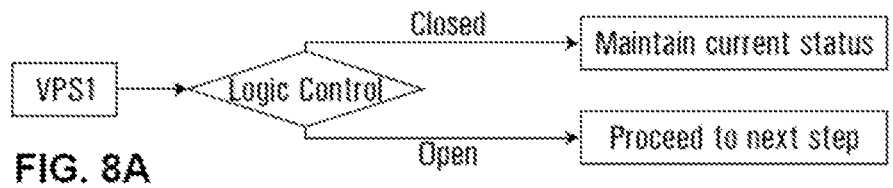
FIG. 8 shows a logic flow diagram of a method, according to embodiments of the present disclosure, wherein FIG. 8A show the logic of a method based on the operational position of a valve being in a desired position.
FIG. 8B shows the logic of a method based on the operational position of a valve being in an undesirable position.
FIG. 8C shows the logic of a method to remotely actuate a valve to an intermediate position.

FIG. 8 provides logic flow diagrams that illustrate how the system 1000A can operate a method to remotely control and monitor the operational position of one or more valves on a wellsite/well pad. FIG. 8A represents a scenario where the sensor 50 (shown as VPS1) has detected the position of a moving part of the valve and is indicating that position be sending the output signal data to the processor 400 (shown as logic control). Within the processor 400, a determination is made whether or not the specific valve should maintain its current operational position (i.e. status) or whether or not it is safe to proceed to a next step of changing the operational position of the valve. The determination of whether or not it is safe to proceed is based upon a full mapping of all applicable valves on the well site/well pad being stored within the processor 400 and further data inputs into the processor 400 that will allow a user to understand what step of a particular service is being performed at the time. For example, the further data inputs may indicate that there is currently a high pressure flow of fracturing fluids being directed into the well. As such, that is not a safe time to change the operational position of a master valve from open to closed. This is but one example of how the valve position information provided by the apparatus 10/10A can be integrated into a data capture and storage system that allows users to receive visual indications, for example on the HMI of the remote display unit 500, and to make decisions— based on the step of a well service operation that is occurring—as to whether or not to change the operational position of one or more valves. The skilled person will appreciate that various forms of further data inputs can be integrated to alert the user as to the step of a particular service that is being performed at a given time. Such integrated systems are described in the Applicant's prior filed patent application (PCT/CA2019/050890 entitled APPARATUS, SYSTEM AND PROCESS FOR REGULATING A CONTROL MECHANISM OF A WELL), the entire disclosure of which is incorporated herein by reference.

Figure 8B:
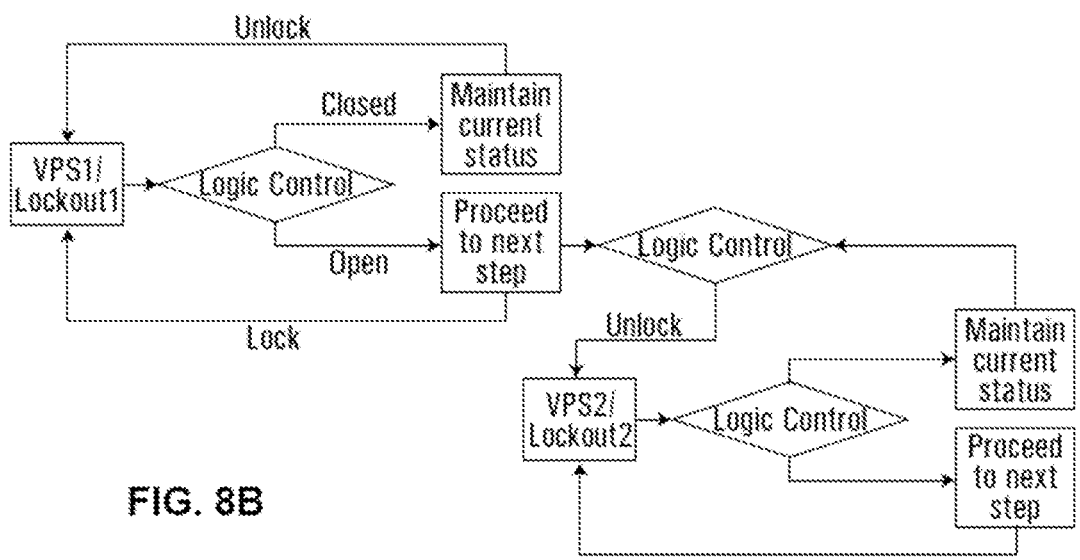

FIG. 8B represents a scenario where the sensor 50 (shown as VPS1) has detected the position of a moving part of the valve and is indicating that position be sending the output signal data to the processor 400 (shown as Logic Control) where a valve position lockout is present on each valve. The valve position lockout is configured to prevent movement of a locked out valve from its current operational position. When a lockout is unlocked, the operational position of the valve can be changed. The lockout mechanism can be a physical barrier that restricts physical interaction or movement with a valve's actuator or the lockout mechanism can be a systematic barrier that prevents the flow of power (hydraulic, pneumatic or electrical) to a mechanically controlled valve actuator. In other embodiments of the present disclosure, the lockout mechanism can be a digital lockout, whereby the flow of electrical, pneumatic and hydraulic power for performing an operation on a well is controllable by a digital control system of which the processors 400 can control one or more aspects of. Non-limiting examples of such digital control system are described in Applicant's prior filed patent application (PCT/CA2019/050890 entitled APPARATUS, SYSTEM AND PROCESS FOR REGULATING A CONTROL MECHANISM OF A WELL). In the event that the sensor 50 indicates that the valve is not in a desired operational position for a step of the operation that is being performed on the well or soon to be performed on the well, the processor 400 can proceed to unlock the lockout on the valve and this will result in a further signal being communicated to the processor 400, which will then assess whether or not the unlocked status is acceptable or not. If acceptable, the user may then proceed to the next step of the process. If the unlocked status is not acceptable, then the lockout may be re-locked to prevent any change in the operational position of the valve.

Figure 8C:
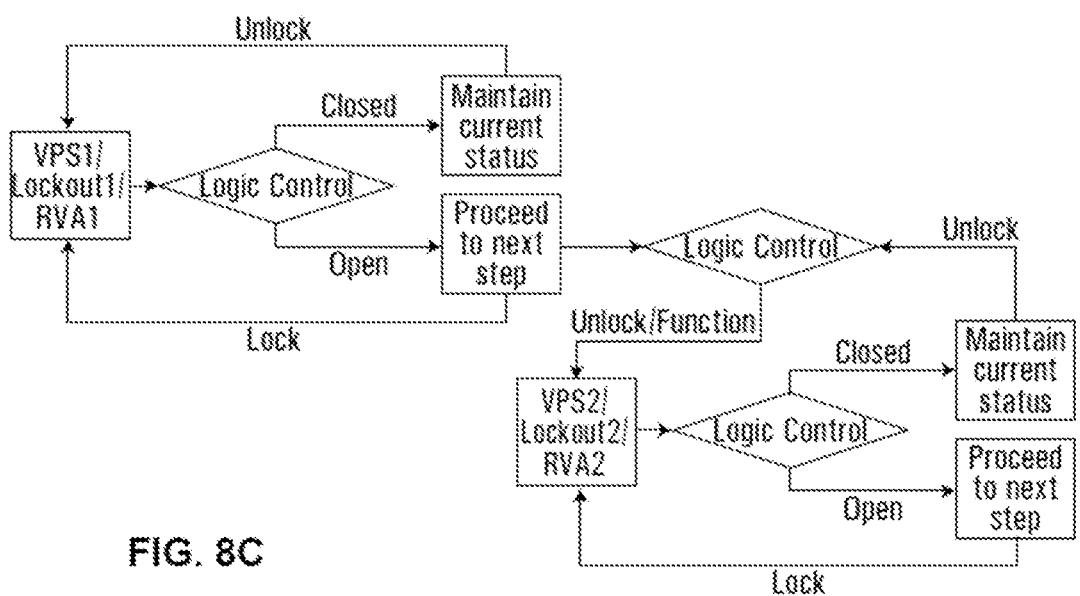

FIG. 8C represents a scenario where it is desired to move the valve to an intermediate position so that the apparatus 10/10A indicates that the valve is approximately halfway between the 0 and 100 of the applied scale (as discussed above).

Figure 9:
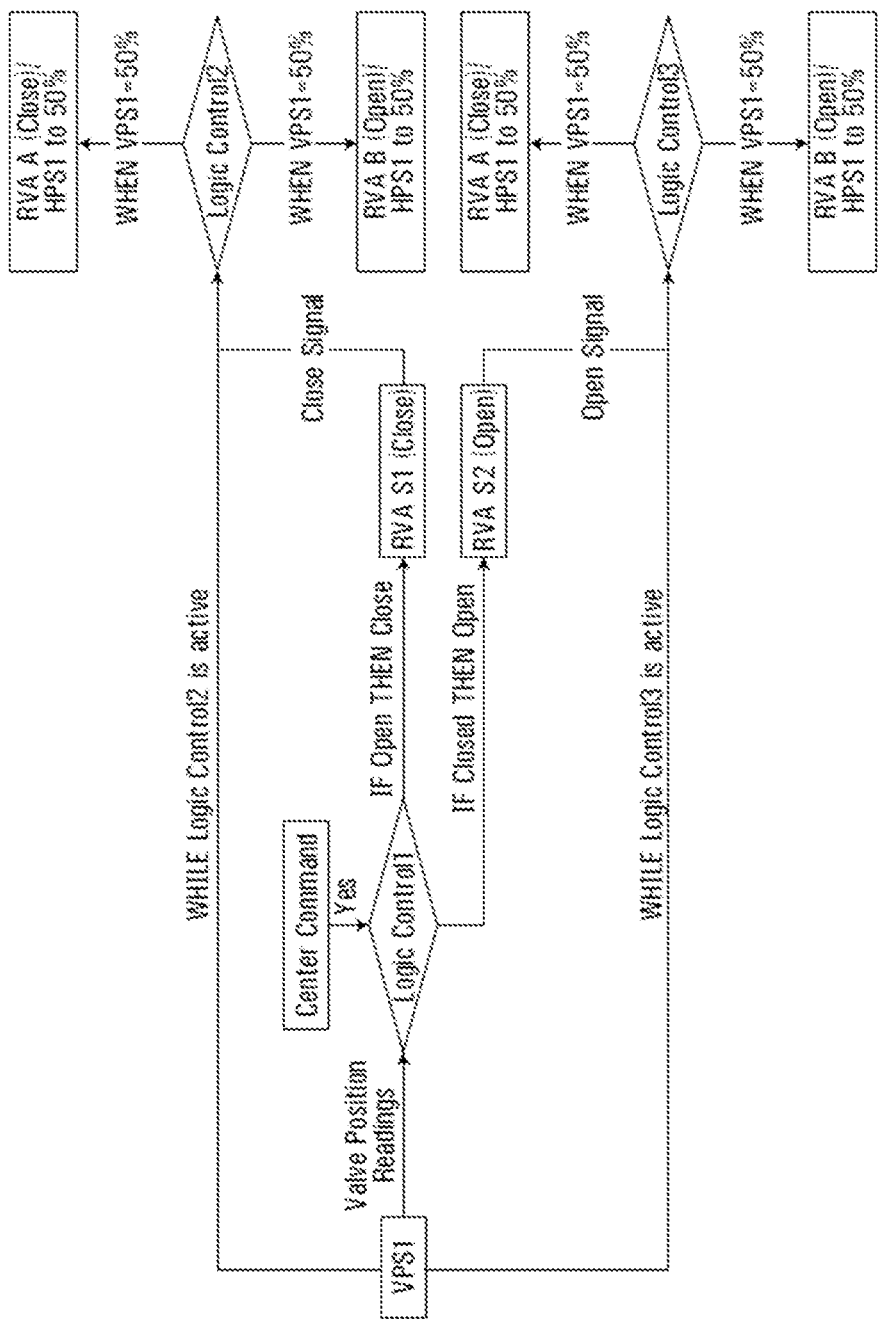
FIG. 9 shows a logic flow diagram of a method, according to embodiments of the present disclosure.

FIG. 9 shows a scenario where the system 1000A where each valve that is included has its own apparatus 10/10A (shown as VPS1) and its own actuator 2008 (shown as RVA).

In some embodiments, the present disclosure provides a method 2000 for detecting and indicating an operational position of valve of wellsite equipment. The method 2000 comprises a step 2100 of releasably coupling an apparatus 10/10A to a non-moving part of the valve or wellsite equipment. The method 2000 also comprises a step of detecting 2200 the position of a moving part of the valve, relative to a fixed point (or otherwise), a step 2202 of indicating the detected position of the moving part of the valve by communicating an output signal. Optionally, the method comprises a step 2204 of observing the output signal so that operators of one or more services being performed at a given well can make operational decisions.

The step 2200 of detecting a position of the actuator may be performed by the sensor 50. The sensor 50 may be in fluid communication and, therefore acoustic communication with a moving part of the valve. Alternatively, the sensor 50 may be coupled to the moving part of the valve and in fluid communication with a non-moving part of the valve (which acts as the target surface).

In some embodiments of the present disclosure, the step 2202 of indicating comprises: a step 2210 of processing the output signal into a processed output signal; and a step 2220 of converting the processed output signal and transmitting the processed output signal, via wired or wireless electronic communication, for display on a display unit, that may be remote from the valve itself, or not. In an embodiment, the processing step is by a processor such as the processor 400 described elsewhere herein. In an embodiment, the display unit may be the remote display unit 500 described elsewhere herein. In an embodiment, the image is a graphical image, an alphanumeric image, a colour, or any combination thereof. In an embodiment, a change of the graphical image, such as for example a colour change, may indicate whether the actuator is in a first position, a second position or therebetween. Furthermore, the data that is used to generate the image can be used in numerical form for further control or analysis work.

In an embodiment, the processed output signal (and the associated image displayed on a remote display unit) indicates the position of a moving part of the valve. The position of the moving part of the valve indicates the operational position of the valve being an open position, a closed position, or, optionally, an intermediate position.

The image on the display unit may inform a consultant or other user to make operational decisions about service operations being performed at the well pad for example, for example whether or not to actuate one or more valves of wellsite equipment, turn on or off one or more fluid pumps, extend or retract wireline or coiled tubing from the well, or other operational decisions that are apparent to those skilled in the art.

What is claimed is:

1. An apparatus for detecting a target surface of a valve and indicating an operational position of a valve, the apparatus comprising:
   a. a mounting portion configured to removably couple to a non-moving part of a valve or a non-moving part of an associated equipment;
   b. a housing portion;
   c. a sensor at least partially housed in the housing portion, the sensor configured to be in communication with the target surface for contactless detecting of the operational position of the valve within a specified range of movement based upon a detected distance between the sensor and the target surface, wherein the target surface moves linearly towards and away from the sensor, and wherein the sensor comprises an ultrasonic TOF sensor assembly, a laser TOF sensor assembly, a LI DAR TOF sensor assembly, a radar TOF sensor assembly or combinations thereof; and
   d. a push rod assembly positioned between the sensor and the target surface.

2. The apparatus of claim 1, wherein the target surface is defined by a moving part of the valve.

3. The apparatus of claim 1, wherein the sensor is in acoustic communication with the target surface.

4. The apparatus of claim 1, wherein the sensor is in electromagnetic communication with the target surface.

5. The apparatus of claim 2, wherein the moving part of the valve moves in a linear fashion.

6. The apparatus of claim 2, wherein the moving part of the valve is actuated by a rotatable actuator and the housing houses the target surface and the target surface is fixable to a part of the rotatable actuator.

7. The apparatus of claim 1, wherein an inner surface of the apparatus defines a focusing tube.

8. The apparatus of claim 1, wherein the sensor comprises an ultrasonic TOF sensor assembly.

9. The apparatus of claim 1, wherein the mounting portion comprises an adaptable mount.

10. The apparatus of claim 1, wherein the mounting portion comprises a valve guard that is sealingly and removably connectible to the valve or associated equipment.

11. A system for detecting a target surface of a valve and indicating an operational position of the valve, the system comprising:
   a. an apparatus comprising:
      i. a mounting portion that configured to removably couple to a non-moving part of a valve or a non-moving part of an associated equipment;
      ii. a housing portion;
      iii. a sensor at least partially housed in the housing portion, the sensor configured to be in communication with the target surface for contactless detecting of the operational position of the valve within a specified range of movement based upon the detected distance between the sensor and the target surface, wherein the target surface moves linearly towards and away from the sensor, and the sensor further configured to indicate the operational position by communicating an output signal and wherein the sensor comprises an ultrasonic TOF sensor assembly, a laser TOF sensor assembly, a LIDAR TOF sensor assembly, a radar TOF sensor assembly or combinations thereof; and
      iv. a push rod assembly positioned between the sensor and the target surface, and b. a processor that is configured to receive the output signal and to generate a display signal that indicates the operational position of the valve.

12. The system of claim 11, further comprising a display unit for receiving the processed signal and displaying an image that indicates the position of the actuator.

13. The system of claim 11, wherein the display unit is remote from the valve or associated equipment.

14. The system of claim 11, wherein the sensor comprises an ultrasonic TOF sensor assembly.

15. A method for detecting and indicating an operational position of a valve, the method comprising:
   a. removably securing an apparatus to a non-moving part of a valve or a non-moving part of an associated equipment, the apparatus comprising a sensor, the sensor comprising an ultrasonic TOF sensor assembly, a laser TOF sensor assembly, a LI DAR TOF sensor assembly, a radar TOF sensor assembly or combinations thereof,
   b. contactlessly detecting the distance between the sensor and a target surface of the valve or associated equipment within a specified range of movement, wherein the target surface is operatively coupled to a moving part of the valve with a push rod assembly and moves linearly towards and away from the sensor; and
   c. indicating the operational position of the valve actuator based on the detected distance.

16. The method of claim 15, wherein the step of indicating comprises:
   a. a step of processing the output signal into a processed output signal;
   b. a step of converting the processed output signal to an image or data; and
   c. displaying the image or data on a display unit.

17. The apparatus of claim 1, wherein the non-moving part comprises a valve bonnet, a stem shroud, a valve body, a flange or a yoke.

18. The system of claim 11, wherein the non-moving part comprises a valve bonnet, a stem shroud, a valve body, a flange or a yoke.

* * * * *